(12) United States Patent
Horikawa et al.

(10) Patent No.: US 9,800,748 B2
(45) Date of Patent: Oct. 24, 2017

(54) AUTOMATIC DOCUMENT FEEDER, IMAGE READING DEVICE INCORPORATING THE AUTOMATIC DOCUMENT FEEDER, AND IMAGE FORMING APPARATUS INCORPORATING THE IMAGE READING DEVICE

(71) Applicants: Toshiyuki Horikawa, Kanagawa (JP); Yasunobu Youda, Kanagawa (JP); Yohei Osanai, Kanagawa (JP); Tatsuaki Nagano, Kanagawa (JP); Satoshi Narai, Kanagawa (JP); Takuji Kawai, Kanagawa (JP); Daisuke Imaki, Tokyo (JP); Takayuki Andoh, Kanagawa (JP); Susumu Miyazaki, Tokyo (JP); Yuki Fujii, Kanagawa (JP); Koichi Ono, Kanagawa (JP); Takeshi Shikama, Kanagawa (JP); Hiroaki Ikeda, Tokyo (JP); Shingo Shiramura, Kanagawa (JP); Hideo Tanaka, Kanagawa (JP); Tetsuo Inui, Kanagawa (JP)

(72) Inventors: Toshiyuki Horikawa, Kanagawa (JP); Yasunobu Youda, Kanagawa (JP); Yohei Osanai, Kanagawa (JP); Tatsuaki Nagano, Kanagawa (JP); Satoshi Narai, Kanagawa (JP); Takuji Kawai, Kanagawa (JP); Daisuke Imaki, Tokyo (JP); Takayuki Andoh, Kanagawa (JP); Susumu Miyazaki, Tokyo (JP); Yuki Fujii, Kanagawa (JP); Koichi Ono, Kanagawa (JP); Takeshi Shikama, Kanagawa (JP); Hiroaki Ikeda, Tokyo (JP); Shingo Shiramura, Kanagawa (JP); Hideo Tanaka, Kanagawa (JP); Tetsuo Inui, Kanagawa (JP)

(73) Assignee: RICOH COMPANY LTD., Tokyo (JP)

( * ) Notice: Subject to any disclaimer, the term of this patent is extended or adjusted under 35 U.S.C. 154(b) by 0 days.

(21) Appl. No.: 15/347,932

(22) Filed: Nov. 10, 2016

(65) Prior Publication Data
US 2017/0142265 A1 May 18, 2017

(30) Foreign Application Priority Data
Nov. 13, 2015 (JP) .................................. 2015-223043

(51) Int. Cl.
*B65H 3/06* (2006.01)
*H04N 1/00* (2006.01)
(Continued)

(52) U.S. Cl.
CPC ......... *H04N 1/0057* (2013.01); *B65H 3/0669* (2013.01); *B65H 3/5261* (2013.01);
(Continued)

(58) Field of Classification Search
CPC ................ B65H 3/0669; B65H 3/5261; B65H 2403/541; B65H 2403/40; B65H 2403/721; B65H 2403/42; B65H 2402/441
See application file for complete search history.

(56) References Cited

U.S. PATENT DOCUMENTS 6,578,840 B1 *  6/2003  Kudo ................... B65H 3/0669
                                                    271/10.01
7,549,627 B2 *  6/2009  Lin ....................... B65H 3/0669
                                                    271/10.01
(Continued)

FOREIGN PATENT DOCUMENTS

JP  2005-231873  9/2005
JP  2009-069556  4/2009

*Primary Examiner* — Luis A Gonzalez

(74) *Attorney, Agent, or Firm* — Harness, Dickey & Pierce, P.L.C.

(57) ABSTRACT

An automatic document feeder that is included in an image reader of an image forming apparatus includes a sheet conveying roller, a document feeder cover, a projection piece, a motor, a driving side gear, and a driving force transmission device including an idler gear, a driving force release gear, a slide body, a first elastic body to bias the idler gear and the driving force release gear to be separated, a second elastic body to bias the driving force release gear and the slide body to be separated, and a drive shaft. The driving force transmission device meshes the driving and driven side meshing portions together with a biasing force applied by the second elastic body when the document feeder cover is closed, and releases the driving and driven side meshing portions with a biasing force applied by the first elastic body when the document feeder cover is opened.

10 Claims, 8 Drawing Sheets

(51) Int. Cl.
| | |
|---|---|
| *B65H 5/06* | (2006.01) |
| *B65H 7/00* | (2006.01) |
| *G03G 15/00* | (2006.01) |
| *B65H 3/52* | (2006.01) |

(52) U.S. Cl.
CPC ............. *B65H 5/06* (2013.01); *B65H 7/00* (2013.01); *G03G 15/6529* (2013.01); *H04N 1/0032* (2013.01); *B65H 2402/441* (2013.01); *B65H 2403/541* (2013.01); *B65H 2403/721* (2013.01); *B65H 2801/06* (2013.01); *H04N 2201/0094* (2013.01)

(56) References Cited

U.S. PATENT DOCUMENTS

| | | | | |
|---|---|---|---|---|
| 7,954,812 | B2* | 6/2011 | Shimmachi | G03G 15/50 271/264 |
| 8,079,586 | B2* | 12/2011 | Watanabe | B65H 3/0638 271/145 |
| 8,894,061 | B2* | 11/2014 | Matsuoka | B65H 5/06 271/10.13 |
| 2009/0074506 | A1 | 3/2009 | Sugiyama et al. | |
| 2014/0347711 | A1 | 11/2014 | Narai et al. | |
| 2015/0341515 | A1 | 11/2015 | Youda et al. | |
| 2016/0127590 | A1 | 5/2016 | Hatayama et al. | |
| 2016/0277624 | A1 | 9/2016 | Osanai et al. | |

\* cited by examiner

AUTOMATIC DOCUMENT FEEDER, IMAGE READING DEVICE INCORPORATING THE AUTOMATIC DOCUMENT FEEDER, AND IMAGE FORMING APPARATUS INCORPORATING THE IMAGE READING DEVICE

CROSS-REFERENCE TO RELATED APPLICATION

This patent application is based on and claims priority pursuant to 35 U.S.C. §119(a) to Japanese Patent Application No. 2015-223043, filed on Nov. 13, 2015, in the Japan Patent Office, the entire disclosure of which is hereby incorporated by reference herein.

BACKGROUND

Technical Field

This disclosure relates to an automatic document feeder having a driving release mechanism that releases transmission of a driving force between a roller that conveys an original document and a driving source, an image reading device that incorporates the automatic document feeder, and an image forming apparatus that incorporates the image reading device.

Related Art

Various types of image reading devices are known to include an automatic document feeder (hereinafter, referred to as an ADF) including a document table on which an original document is set, a conveying unit that conveys the original document, and a sheet ejection tray that ejects a read original document to separate and convey the original documents set on the document table one by one and to consecutively perform reading.

The ADF conveys the original document by connecting a sheet conveying roller and a motor as the driving source through gears and driving the sheet conveying roller. As the gear attached to the motor, in general, a spur tooth gear or a helical gear is used. However, in recent years, since quietness of the device is required, a configuration of driving where a worm gear having higher quietness is attached to a motor has appeared.

As a feature of the configuration using the worm gear, there is a self-lock function of the worm gear. The self-lock function is a function where the worm gear side can transmit a driving force to rotate the sheet conveying roller but the opposite side, that is, the sheet conveying roller side is locked and therefore cannot rotate the worm gear.

In general, in the ADF, when jam (paper jam) of the original document occurs during sheet conveyance, a user opens a document feeder cover that functions as a portion of a conveying passage and removes the original document by turning a paper jam handling dial provided to pull out the original document by hand. At this time, if the worm gear is connected to a drive system, due to the above-described self-lock function, the worm gear is not allowed to be rotated by the sheet conveying roller side, namely, the sheet conveying roller is locked, so that paper jam handling cannot be performed.

In order to address this inconvenience, known ADFs have a configuration including a driving release mechanism disconnecting transmission of the driving force between the worm gear and the sheet conveying roller in association with the opening operation, at the time of opening the document feeder cover for paper jam removal, so that the sheet conveying roller is not locked.

The driving release mechanism has a configuration, for example, in which a gear (hereinafter, referred to as a drive release gear) that is moved by a spring force in association with the opening operation of the document feeder cover and an idler gear that is connected to the worm gear are attached coaxially. In addition, the driving release mechanism is provided with meshing portions having pawls, projections, or gears that are provided so as to be meshed with the drive release gear and the idler gear. In the driving release mechanism having the configuration, transmission and release of the driving force are implemented by the drive release gear and the idler gear engaging (connecting) or releasing engagement of the meshing portions.

In addition, in the known ADFs, for example, as a device transmitting a driving force of a motor used for a process cartridge, a device including a plurality of involute spline joints are provided, and each involute spline joint is engaged with an involute spline joint of a driven side through meshing, so that a driving force for rotation is transmitted.

SUMMARY

At least one aspect of this disclosure provides an automatic document feeder including a sheet conveying roller, a document feeder cover, a projection piece, a motor, a driving side gear, and a driving force transmission device. The sheet conveying roller is configured to convey an original document along a document conveying passage. The document feeder cover is openable between a closed state relative to the document conveying passage in which a document feeder of the original document is defined and an open state in which the document feeder is checked. The projection piece is mounted on an inner face side of the document feeder cover corresponding to the document conveying passage. The motor has an output shaft and drives the sheet conveying roller. The driving side gear is mounted on the output shaft of the motor. The driving force transmission device includes an idler gear, a driving force release gear, a slide body, a first elastic body, a second elastic body, and a drive shaft. The idler gear has a driving side meshing portion and meshes with the driving side gear. The driving force release gear has a driven side meshing portion configured to be meshed with the driving side meshing portion. The slide body is configured to be pressed by the projection piece and slide when the document feeder cover is closed and brought into contact with the projection piece. The first elastic body is inserted between the idler gear and the driving force release gear and is configured to bias the idler gear and the driving force release gear in a direction to separate the idler gear and the driving force release gear from each other. The second elastic body is inserted between the driving force release gear and the slide body and is configured to bias the driving force release gear and the slide body in a direction to separate the driving force release gear and the slide body from each other. The drive shaft on which the idler gear, the driving force release gear, the slide body, the first elastic body, and the second elastic body are mounted coaxially. The driving force transmission device is configured to mesh the driving side meshing portion and the driven side meshing portion together by pressing the driving force release gear against the idler gear with a biasing force applied by the second elastic body at a first sliding position of the slide body when the document feeder cover is closed. The driving force transmission device is configured to release engagement of the driving side meshing portion and the driven side meshing portion by separating the driving force release gear from the idler gear with a biasing force applied by the first elastic body at a second sliding position of the slide body when the document feeder cover is opened.

Further, at least one aspect of this disclosure provides an image reading device including the above-described automatic document feeder.

Further, at least one aspect of this disclosure provides an image forming apparatus including the above-described image reading device.

DETAILED DESCRIPTION

Figure 1:
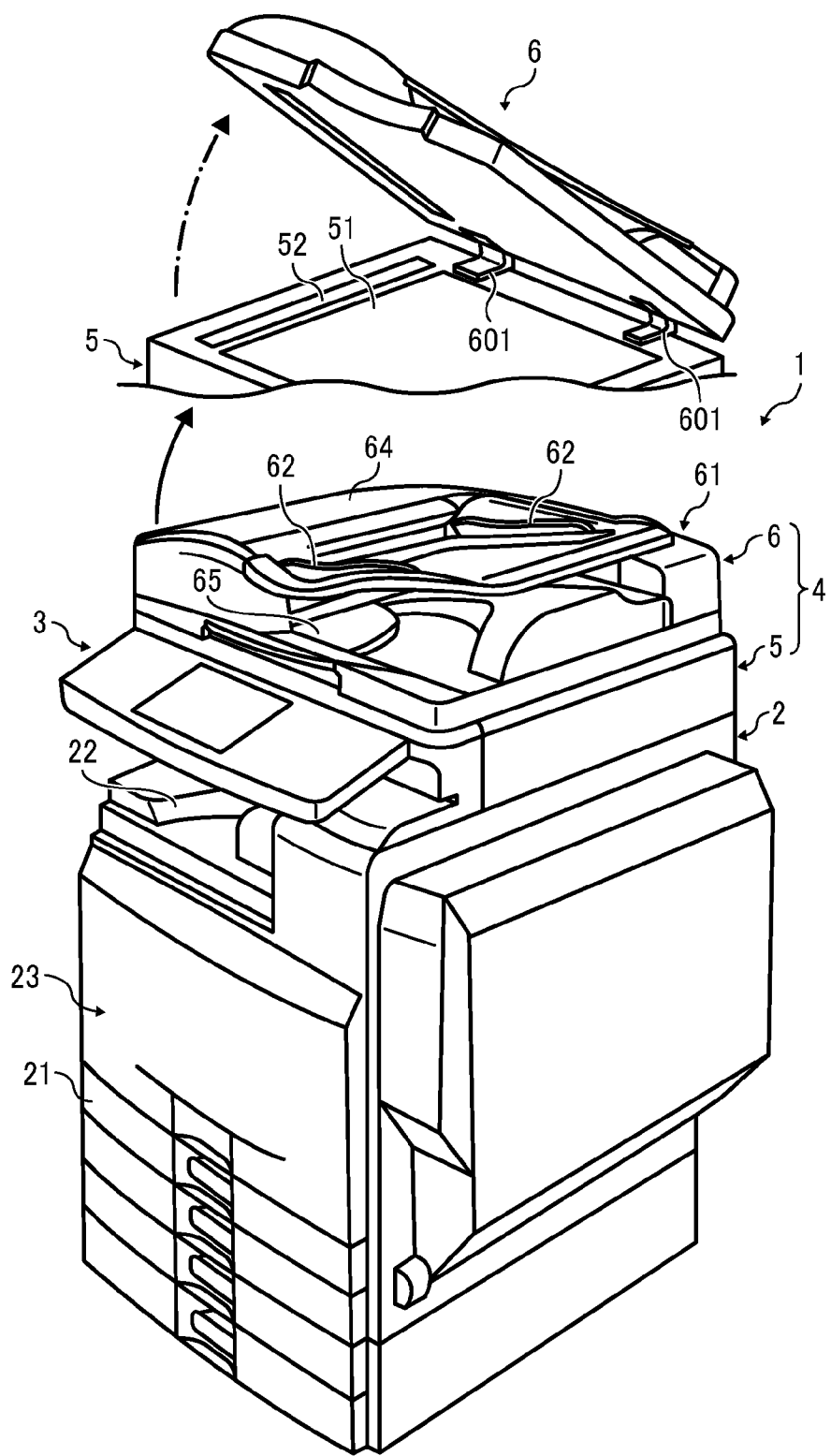
FIG. 1 is a schematic view illustrating an outer appearance structure of an image forming apparatus according to Embodiment 1.

It will be understood that if an element or layer is referred to as being "on", "against", "connected to" or "coupled to" another element or layer, then it can be directly on, against, connected or coupled to the other element or layer, or intervening elements or layers may be present. In contrast, if an element is referred to as being "directly on", "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath", "below", "lower", "above", "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

Although the terms first, second, etc. may be used herein to describe various elements, components, regions, layers and/or sections, it should be understood that these elements, components, regions, layer and/or sections should not be limited by these terms. These terms are used to distinguish one element, component, region, layer or section from another region, layer or section. Thus, a first element, component, region, layer or section discussed below could be termed a second element, component, region, layer or section without departing from the teachings of the present disclosure.

The terminology used herein is for describing particular embodiments and examples and is not intended to be limiting of exemplary embodiments of this disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Descriptions are given, with reference to the accompanying drawings, of examples, exemplary embodiments, modification of exemplary embodiments, etc., of an image forming apparatus according to exemplary embodiments of this disclosure. Elements having the same functions and shapes are denoted by the same reference numerals throughout the specification and redundant descriptions are omitted. Elements that do not demand descriptions may be omitted from the drawings as a matter of convenience. Reference numerals of elements extracted from the patent publications are in parentheses so as to be distinguished from those of exemplary embodiments of this disclosure.

This disclosure is applicable to any image forming apparatus, and is implemented in the most effective manner in an electrophotographic image forming apparatus.

In describing preferred embodiments illustrated in the drawings, specific terminology is employed for the sake of clarity. However, the disclosure of this disclosure is not intended to be limited to the specific terminology so selected and it is to be understood that each specific element includes any and all technical equivalents that have the same function, operate in a similar manner, and achieve a similar result.

Referring now to the drawings, wherein like reference numerals designate identical or corresponding parts throughout the several views, preferred embodiments of this disclosure are described.

Embodiments relating to an automatic document feeder, an image reading device, and an image forming apparatus according to this disclosure will be described with reference to the drawings.

Embodiment 1

A description is given of an entire configuration and functions of an image forming apparatus 1 according to Embodiment 1 of this disclosure.

Figure 2:
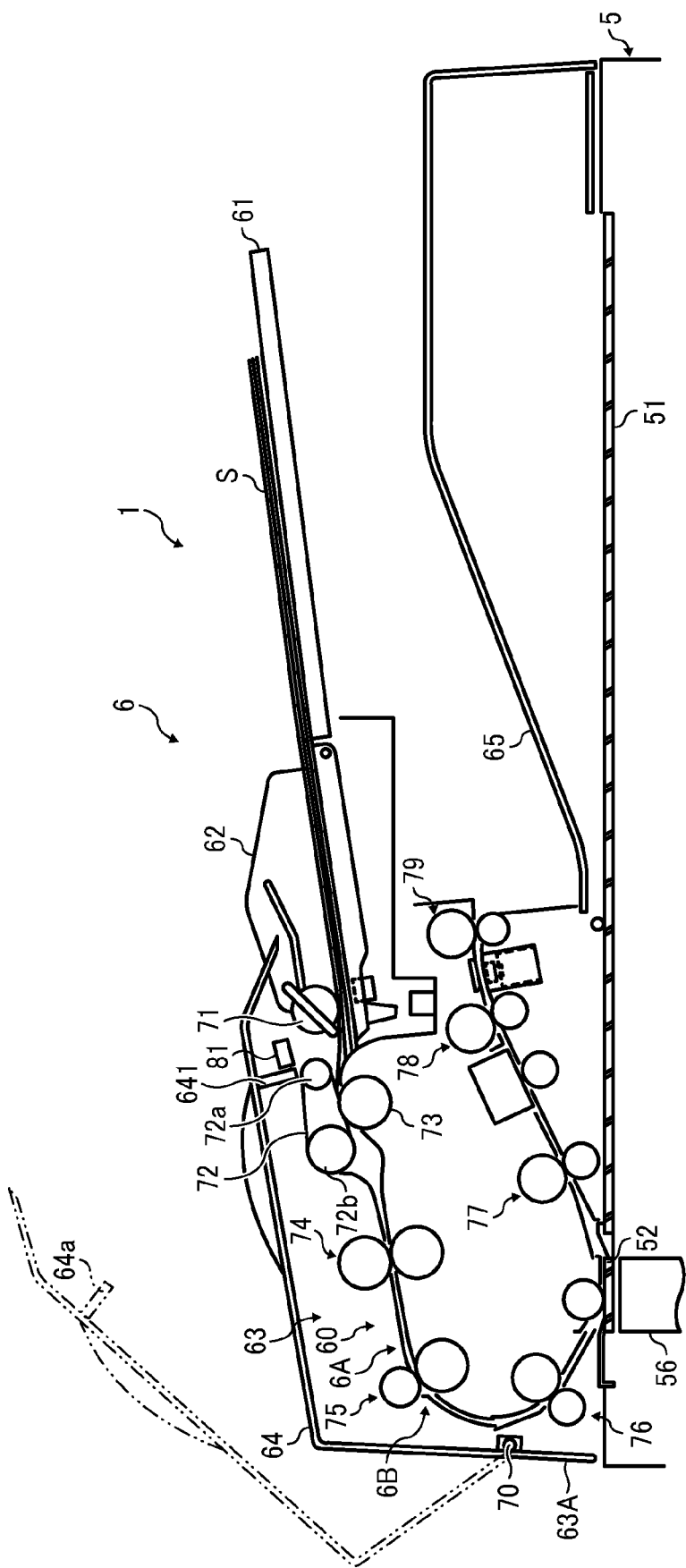
FIG. 2 is a schematic configuration diagram illustrating an ADF of the image forming apparatus according to Embodiment 1 together with an upper portion of a scanner.

FIG. 1 is a schematic view illustrating an outer appearance structure of the image forming apparatus 1 according to Embodiment 1. FIG. 2 is a schematic configuration diagram illustrating an ADF 6 of the image forming apparatus 1 according to Embodiment 1 together with an upper portion of a scanner 5.

It is to be noted that identical parts are given identical reference numerals and redundant descriptions are summarized or omitted accordingly.

The image forming apparatus 1 may be a copier, a facsimile machine, a printer, a multifunction peripheral or a multifunction printer (MFP) having at least one of copying, printing, scanning, facsimile, and plotter functions, or the like. According to the present example, the image forming apparatus 1 is an electrophotographic copier that forms toner images on recording media by electrophotography.

It is to be noted in the following examples that: the term "image forming apparatus" indicates an apparatus in which an image is formed on a recording medium such as paper, OHP (overhead projector) transparencies, OHP film sheet, thread, fiber, fabric, leather, metal, plastic, glass, wood, and/or ceramic by attracting developer or ink thereto; the term "image formation" indicates an action for providing (i.e., printing) not only an image having meanings such as texts and figures on a recording medium but also an image having no meaning such as patterns on a recording medium; and the term "sheet" is not limited to indicate a paper material but also includes the above-described plastic material (e.g., a OHP sheet), a fabric sheet and so forth, and is used to which the developer or ink is attracted. In addition, the "sheet" is not limited to a flexible sheet but is applicable to a rigid plate-shaped sheet and a relatively thick sheet.

Further, size (dimension), material, shape, and relative positions used to describe each of the components and units are examples, and the scope of this disclosure is not limited thereto unless otherwise specified.

Further, it is to be noted in the following examples that: the term "sheet conveying direction" indicates a direction in which a recording medium travels from an upstream side of a sheet conveying path to a downstream side thereof; the term "width direction" indicates a direction basically perpendicular to the sheet conveying direction.

Figure 9:
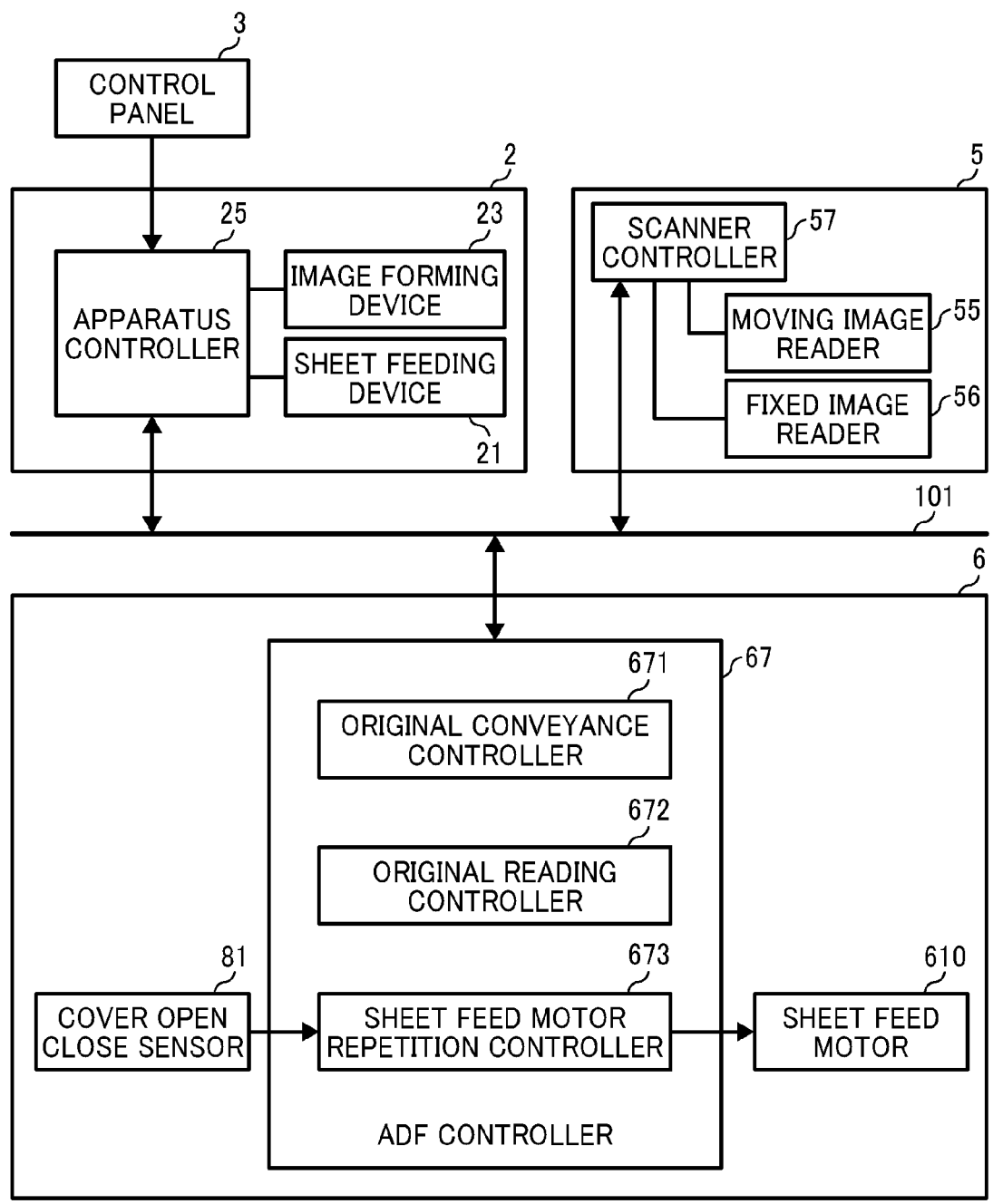
FIG. 9 is a schematic functional block diagram of an overall image forming apparatus including an ADF controller performing control of an overall ADF.

As illustrated in FIGS. 1, 2, and 9, the image forming apparatus 1 is a digital multifunction peripheral including a document feeder 21, a main body 2 having an image forming unit 23 and a control unit 3 on an outside front portion through which a user instructs operation or the like, the scanner 5 that is disposed overlapping a sheet ejection tray 22 for recording sheets, and an automatic document feeder (hereinafter, referred to as an ADF) 6 that is disposed overlapping the scanner 5 inside thereof. The scanner 5 and the ADF 6 constitute an image reading device (image reading unit) 4.

First, a description is given of the image forming unit 23 in the main body 2 illustrated in FIG. 9.

The image forming unit 23 includes, for example, an exposing unit, a plurality of photoconductor drums, a developing device using four color toners of cyan (C), magenta (M), yellow (Y), and black (K), a transfer belt, a secondary transfer unit, a fixing unit, and the like. The image forming unit 23 allows the exposing unit to expose photoconductor drums of the colors to form electrostatic latent images on the photoconductor drums on the basis of, for example, a read image obtained by the scanner 5 reading the original document S conveyed by the ADF 6 or print data transmitted from an external device such as a personal computer (PC) and allows developing units for the colors of the developing device to supply toners onto the electrostatic latent images of the photoconductor drums to perform developing. In addition, the image forming unit 23 primarily transfers the toner images of the photoconductor drums of the colors onto the transfer belt, and secondarily transfers the toner images of the secondary transfer unit to the recording sheet fed from the document feeder 21 in an overlapped manner. Then, the image forming unit 23 allows the fixing unit to fix the toner images on the recording sheet by application of heat and pressure, so that a color image is formed.

Next, a description is given of other configurations of the image forming unit 23.

The control unit 3 is equipped with a numeric keypad, control keys such as various function keys, and a display area displaying various types of information. A user performs instruction or the like associated with various functions, for example, by operating the control keys following operation guidance displayed on the display area. The display area also displays information for notifying the occurrence of a failure, for example, the occurrence of a paper jam of the original document S in the ADF 6.

The image reading device 4 includes the scanner 5 that is secured above the main body 2 and the ADF 6 which is supported by the upper portion of the scanner 5. As illustrated in the upper portion of FIG. 1, the scanner 5 supports the ADF 6 so as to be swingable in the vertical direction by a hinge 601, namely, so as to be openable between the opened state and the closed state like an openable door.

In the scanner 5, a first contact glass 51 and a second contact glass 52 are provided on the top surface thereof (see FIG. 1). In the scanner 5, the first contact glass 51 or the second contact glass 52 of the top surface is exposed in the state in which the ADF 6 is opened. The lower inner portion of the scanner 5 includes a scanning portion 55, a fixed scanning portion 56, and a scanner controller 57. The scanning portion 55 reads an image of the original document S when the original document S is placed on the first contact glass 51. The fixed scanning portion 56 reads an image of the original document S passing through the second contact glass 52. The scanner controller 57 performs overall control of the scanner 5 including control of the image reading in the scanning portion 55 and the fixed scanning portion 56 (see FIGS. 2 and 9).

As illustrated in FIGS. 1 and 2, the ADF 6 includes a document table 61, side guide panels 62, a document conveying portion 63, a document feeder cover 64 and a document ejection unit 65. A bundle of the original documents S is placed on the document table 61 to be read by the scanner 5. The side guide panels 62 are members of regulating the width-directional positions of the bundle of the original documents S placed on the document table 61, namely, the positions in a direction perpendicular to the direction of arrow A, which is the document conveying direction.

It is to be noted that the side guide panels 62 according to Embodiment 1 are designed to relatively approach each other and separate from each other, so that the width-directional center of the document table 61 and the width-directional center of the original documents S are coincident with each other. However, the side guide panels 62 are not limited thereto but may be arranged so that one edge of the original documents S is in contact with one edge side of the document table 61 and an opposite edge side of the document table 61 is movable.

The document conveying portion 63 (see FIG. 2) extracts (picks up) the original documents S one by one from the bundle of the original documents S set on the document table 61 and causes a document conveying unit 6B to convey the original document S in a document conveying passage 6A through the upper surface of the second contact glass 52 to the document ejection unit 65.

The document feeder cover 64 includes a cover body that covers the document conveying portion 63 from an outer side. The document feeder cover 64 is openable between a closed state in which the document conveying portion 63 is covered, as indicated by a solid line illustrated in FIG. 2, and an open state in which a portion of the document conveying portion 63 is exposed as indicated by a dotted line illustrated in FIG. 2. An opening and closing operation of the document feeder cover 64 is performed by a rotary shaft 70 provided to a casing 63A. When the document feeder cover 64 is closed so as to cover the document conveying portion 63, the document feeder cover 64 constitutes the document feeder 60 (see FIG. 3) that receives the original document S so as to be interposed between devices facing each other in the document conveying passage 6A and conveys the document S.

Figure 5:
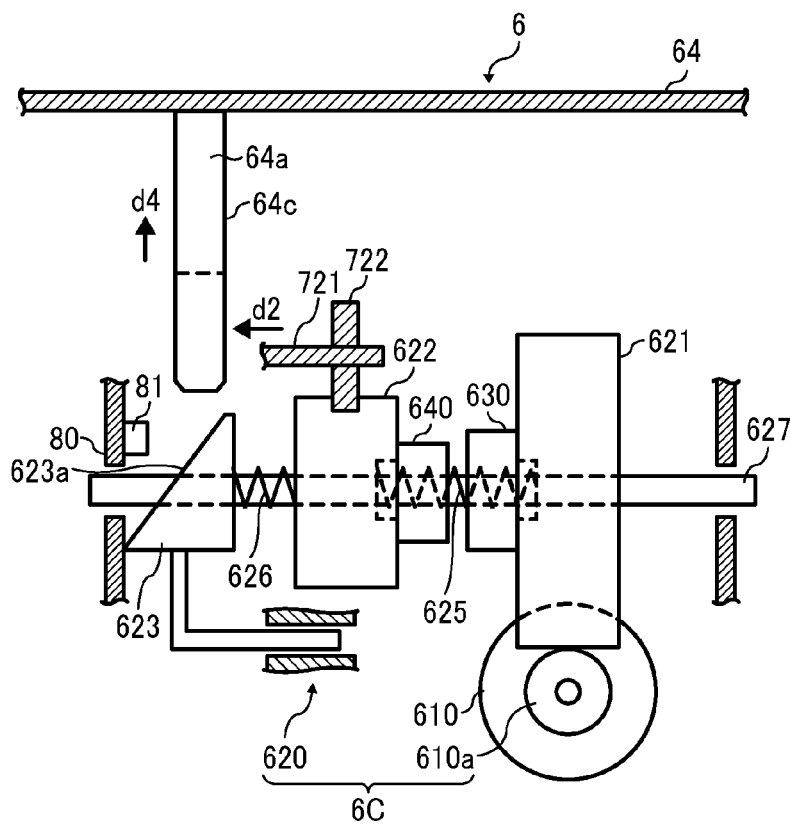
FIG. 5 is a schematic view illustrating a configuration of main components in a cross section of the roller driving unit, taken along line B-B of FIG. 3, and in particular, illustrating a configuration at the time when the document feeder cover is opened.
Figure 6:
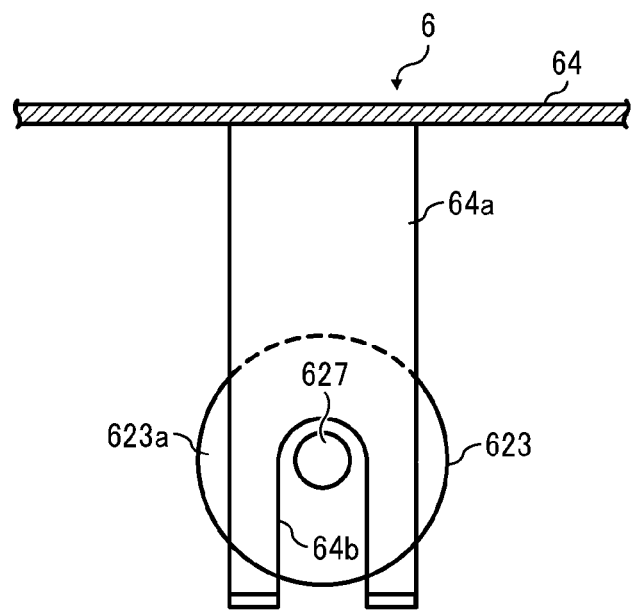
FIG. 6 is a schematic view illustrating a structure of a projection piece of the document feeder cover viewed from a direction of an arrow C of FIG. 4.

In addition, the document feeder cover 64 includes a projection piece 64a that is provided to the inner surface side thereof facing the document conveying portion 63. When the document feeder cover 64 is closed, the projection piece 64a is brought into contact with a slanted side portion 623a of a slide body 623 constituting a driving force transmission device 620 (see FIGS. 3 to 5) of a roller driving unit 6C provided to the casing 63A side. For example, a notch portion 64b is formed in a distal end portion of the projection piece 64a, as illustrated in FIG. 6. When the document feeder cover 64 is closed, a drive shaft 627 that is an element of the driving force transmission device 620 enters into the notch portion 64b of the projection piece 64a, so that the document feeder cover 64 comes to be completely closed while being in contact with the slide body 623.

The document ejection unit 65 ejects the original document S after completion of scanning of the original document S on the second contact glass 52 of the scanner 5.

Figure 3:
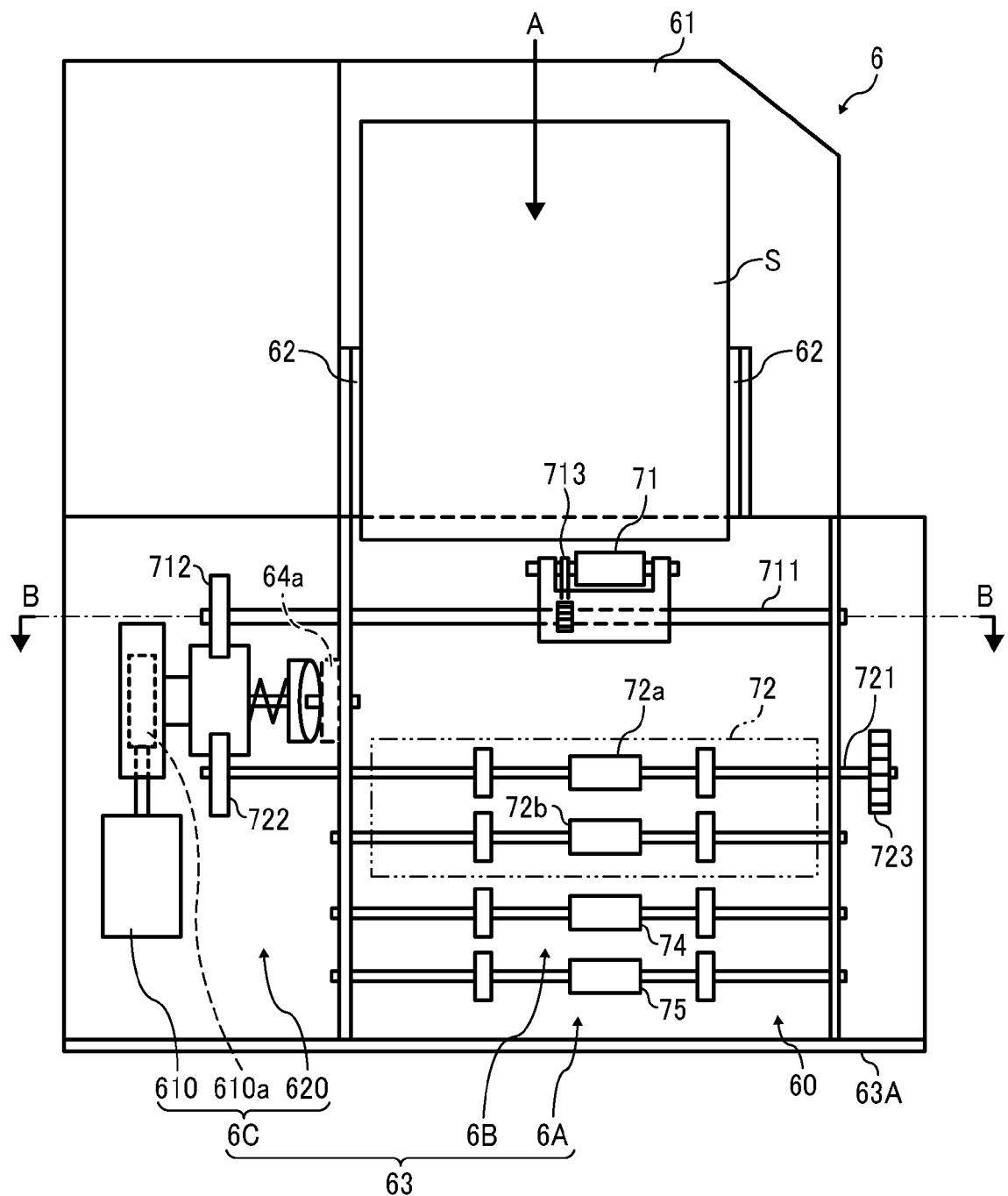
FIG. 3 is a schematic configuration diagram illustrating an inner portion of the ADF of the image forming apparatus according to Embodiment 1, where a configuration viewed from the upper plane in the state that there is no document feeder cover on a document feeder is illustrated.

Next, a further detailed description is given of the internal configuration of the ADF 6, with reference to FIG. 3.

FIG. 3 is a schematic configuration diagram illustrating an inner portion of the ADF 6 of the image forming apparatus 1 according to Embodiment 1, viewed from the upper plane in the state in which the document feeder cover 64 is opened (the state in which the document feeder cover have the posture indicated by the dotted line in FIG. 2) in particular.

As illustrated in FIGS. 2 and 3, the document conveying portion 63 in the ADF 6 includes the document conveying passage 6A, the document conveying unit 6B, and the roller driving unit 6C.

The document conveying passage 6A has a C-shaped structure as a side surface structure where the document conveying passage is provided to extend from the lower end portion of the document conveying direction of the document table 61 toward a downstream side in a planar shape. The document conveying passage 6A is folded back in the direction reverse to the extended installation direction, and is connected through the upper surface of the second contact glass 52 of the scanner 5 to the document ejection unit 65.

The document conveying unit 6B is configured by arranging a pickup roller 71, a document conveying belt 72, a reverse roller 73, a pull-out roller pair 74, an intermediate roller pair 75, a reading inlet roller pair 76, a reading outlet roller pair 77, a second reading outlet roller pair 78, and a sheet ejection roller pair 79 sequentially from the upstream side of the document conveying passage 6A toward the downstream side in the document conveying direction.

The document conveying belt 72 includes an endless belt that is stretched around and between a drive roller 72a and a driven roller 72b. The drive roller 72a is driven to be rotated together with the pickup roller 71 by a sheet feeding motor 610 constituting the roller driving unit 6C as a driving source.

Each of the pull-out roller pair 74, the intermediate roller pair 75, the reading inlet roller pair 76, the reading outlet roller pair 77, the second reading outlet roller pair 78, and the sheet ejection roller pair 79 is configured with a drive roller that is driven by the respective driving motor and a driven roller that is driven to be rotated following the rotation driving of the drive roller while being pressed against the drive roller.

As illustrated in FIG. 3, the roller driving unit 6C includes the sheet feeding motor 610 and a driving force transmission device 620. The sheet feeding motor 610 functions as a driving source and is provided with a driving side gear, for example, a worm gear 610a mounted on the output shaft. The driving force transmission device 620 transmits the driving force of the sheet feeding motor 610, for example, to the pickup roller 71, the drive roller 72a, and the driven roller 72b. The sheet feeding motor 610 includes, for example, any of a direct current (DC) servo motor and a stepping motor.

It is to be noted that, in order to transmit the driving force of the sheet feeding motor 610, the pickup roller 71 includes a rotation gear 712 and a transmission unit 713. The rotation gear 712 is mounted on one end of the rotary shaft 711 in the shaft direction. The transmission unit 713 such as a timing belt is provided at an intermediate position in the shaft direction to transmit rotation of the rotary shaft 711 to the pickup roller 71. The rotation gear 712 meshes with a drive release gear 622 constituting the roller driving unit 6C.

In addition, a rotation gear 722 is mounted on one end of the rotary shaft 721 of the drive roller 72a in the shaft direction, and an operation dial 723 is mounted on an opposite end of the rotary shaft 721 of the drive roller 72a in the shaft direction. Therefore, when the drive release gear 622 of the roller driving unit 6C is in a state in which the driving force from the sheet feeding motor 610 is be transmitted (see FIG. 4), the drive roller 72a is driven to be rotated by the sheet feeding motor 610. Therefore, the drive roller 72a drives the document conveying belt 72 that is stretched between the drive roller 72a and the driven roller 72b to perform conveying (feeding) of the original document S. Further, when the drive release gear 622 of the roller driving unit 6C is in the driving released state in which the driving force from the sheet feeding motor 610 is not transmitted (see FIG. 5), the drive roller 72a can be rotated in the forward rotation direction and the reverse rotation direction by the user turning the operation dial 723.

Next, a further detailed description is given of the driving force transmission device 620 of the roller driving unit 6C, with reference to FIGS. 4 through 7.

Figure 4:
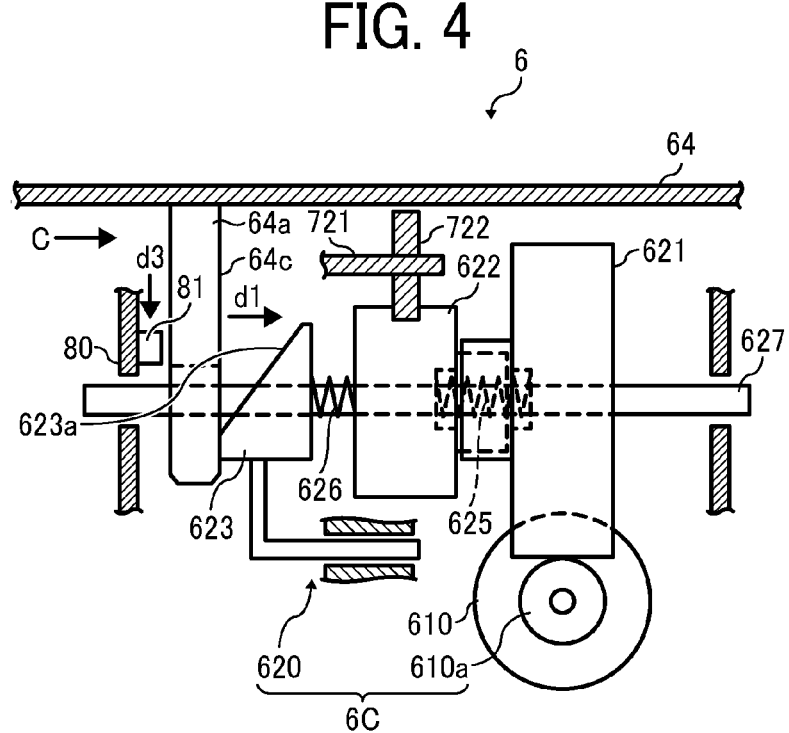
FIG. 4 is a schematic view illustrating a configuration of main components in a cross section of a roller driving unit, taken along line B-B of FIG. 3, and in particular, illustrating a configuration at the time when a document feeder cover is closed.
Figure 7:
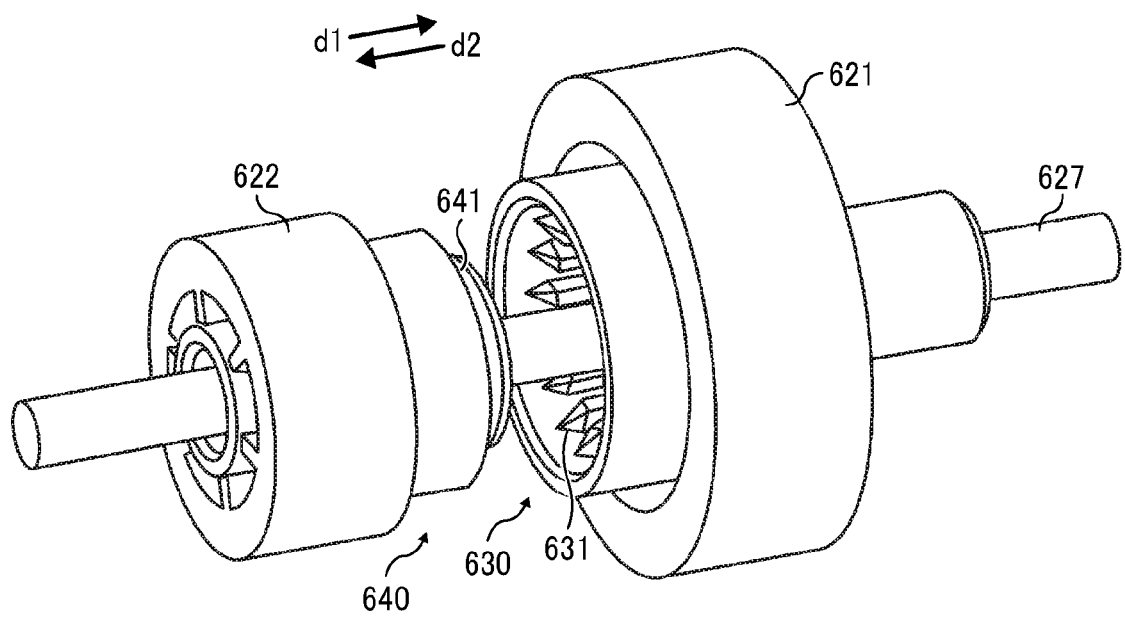
FIG. 7 is a perspective view illustrating a configuration example of a driving release mechanism in the roller driving unit.

FIG. 4 is a schematic view illustrating a configuration of main components in a cross section of the roller driving unit 6C, taken along line B-B of FIG. 3, and in particular, illustrates a configuration at the time when the document feeder cover 64 is closed. FIG. 5 is a schematic view illustrating a configuration of main components in a cross section of the roller driving unit 6C, taken along line B-B of FIG. 3, and in particular, illustrates a configuration at the time when the document feeder cover 64 is opened. FIG. 6 is a schematic view illustrating a structure of the projection piece 64a of the document feeder cover 64, viewed from a direction of an arrow C of FIG. 4. FIG. 7 is a perspective view illustrating a configuration example of the driving release mechanism in the driving force transmission device 620 of the roller driving unit 6C.

As illustrated in FIGS. 3 to 5, in the roller driving unit 6C, the driving force transmission device 620 of the roller driving unit 6C includes an idler gear 621, a drive release gear 622, and a slide body 623. The idler gear 621 is meshed with the worm gear 610a that functions as a driving side gear attached to the output shaft of the sheet feeding motor 610. The idler gear 621, the drive release gear 622, and the slide body 623 are coaxially mounted on the drive shaft 627. It is to be noted that, in a case in which the driving side gear is a worm gear, the idler gear may also be a helical gear.

In some cases, the worm gear 610a is not self-locked according to characteristic values of a tooth right angle pressure angle $α_n$, a reference cylindrical lead angle $γ$, and a friction coefficient $μ$. Even in a case in which the worm gear 610a is not self-locked, if the drive roller 72a is to be rotated from the side of the driven-side gear, a very large load is exerted on the worm gear 610a. For this reason, similarly to the case in which the worm gear 610a is self-locked, even in the case in which the worm gear 610a is not self-locked, in the worm gear 610a, a driving release mechanism is needed to solve the paper jam. Therefore, the worm gear 610a according to the embodiment includes both of the case where the worm gear 610a is self-locked and the case where the worm gear 610a is not self-locked.

It is to be noted that both of the driving side gear and the idler gear may be hypoid gears. Similarly to the worm gear, since the shaft of the meshing gear is at the distortion position, the hypoid gear has a feature that self-lock occurs with a high speed-reduction ratio, for example, a gear ratio of 1/45 or more.

In addition, among the elements constituting the driving force transmission device 620, the idler gear 621 is mounted on the drive shaft 627 to be rotatable and not to be movable in the shaft direction. The drive release gear 622 is mounted on the drive shaft 627 to be integrally rotated and to be movable in the shaft direction.

For example, as illustrated in FIG. 5, the idler gear 621 has a meshing portion 630 at the side facing the drive release gear 622, and the drive release gear 622 has a meshing portion 640 at the side facing the idler gear 621. For example, as illustrated in FIG. 4, the meshing portion 630 of the idler gear 621 and the meshing portion 640 of the drive release gear 622 are engaged with each other and are disengaged from each other in the shaft direction of the drive shaft 627. Therefore, the idler gear 621 and the drive release gear 622 are driven to be rotated following the drive shaft 627 integrally with each other in the state in which the meshing portions 630 and 640 thereof are engaged with each other.

As an example of the configuration of the idler gear 621 and the drive release gear 622, an involute spline joint is applied to the meshing portions 630 and 640 thereof, as illustrated in FIG. 7, for example. It is to be noted that, in FIG. 7 (similarly, in FIG. 8), for the convenience of description, the first elastic member 625 is omitted in illustration.

In FIG. 7, the meshing portion 630 of the idler gear 621 has an involute-spline-shaped internal gear 631, and the meshing portion 640 of the drive release gear 622 has an involute-spline-shaped external gear 641 which is meshed with the internal gear 631. In a case in which the involute spline joint having such a configuration is applied, the drive release gear 622 is operated (pressed) in the shaft direction of the drive shaft 627, for example, in the direction of an arrow d1, so that the external gear 641 of the meshing portion 640 is meshed with the internal gear 631 of the meshing portion 630. In this state, the idler gear 621 and the drive release gear 622 are rotated together with the drive shaft 627.

In addition, according to such a configuration, the drive release gear 622 is operated (separated) in the direction of an arrow d2, which is an opposite direction to the direction of the arrow d1. By so doing, the external gear 641 of the meshing portion 640 and the internal gear 631 of the meshing portion 630 are completely decoupled in the state in which the gears are not meshed with each other, namely, there is no meshed portion. Therefore, the drive release gear 622 implements the driving release with respect to the driving force of the drive shaft 627.

In the example of FIG. 7, the driving-side involute spline joint, that is, the meshing portion 630 is configured with the internal gear, and the driven-side involute spline joint, that is, the meshing portion 640 is configured with the external gear. However, the sides where the internal gear and the external gear are provided or the shape of teeth may be set to have other configurations.

In addition, the configuration of the meshing portion 630 of the idler gear 621 and the meshing portion 640 of the drive release gear 622 is not limited to the configuration where the above-described involute spline joint is applied, but a configuration where other engagement methods are applied may be employed.

Figure 8:
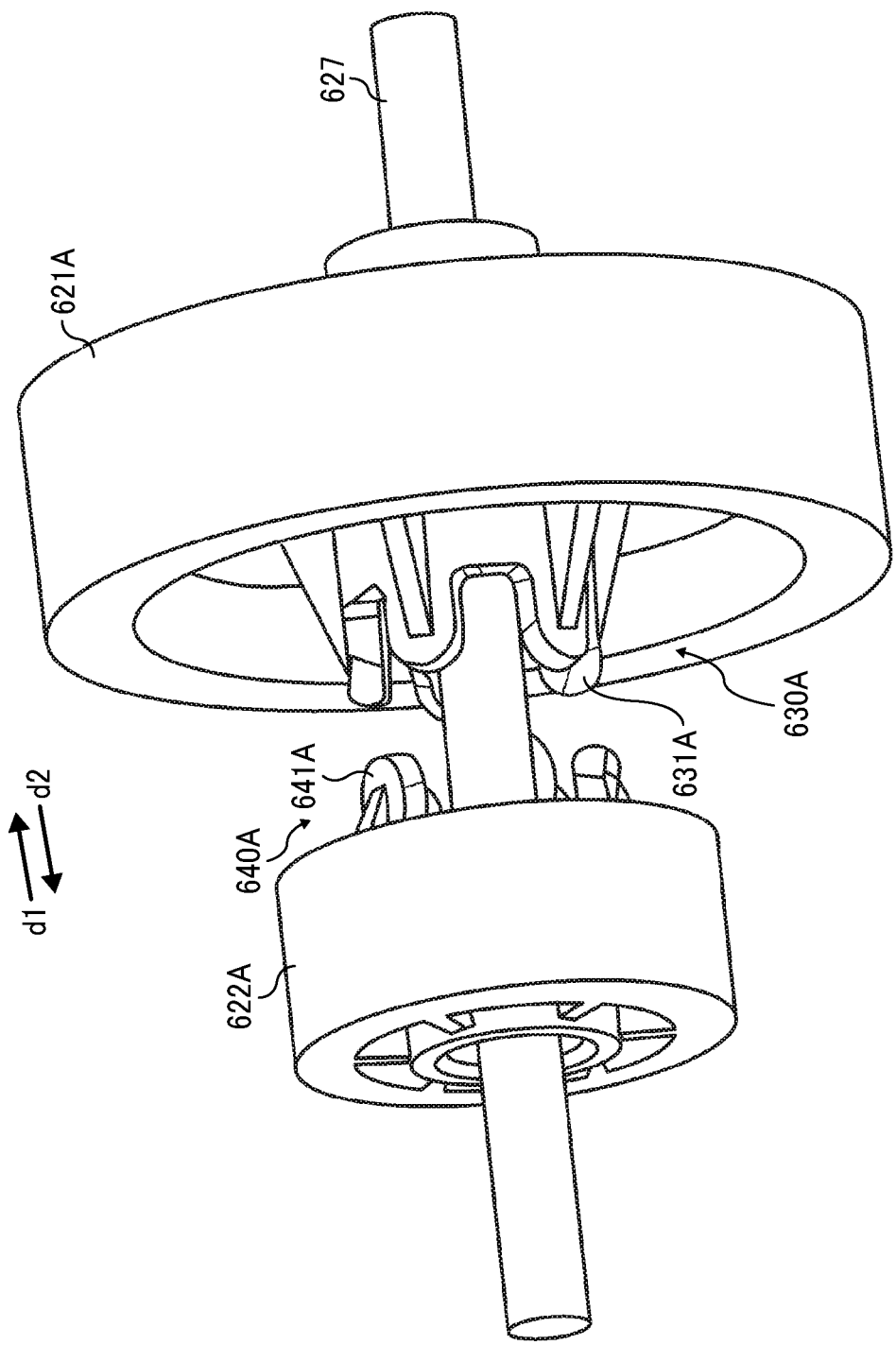
FIG. 8 is a perspective view illustrating another configuration example of the driving release mechanism in the roller driving unit.

FIG. 8 is a perspective view illustrating another configuration example of the driving release mechanism in the driving force transmission device 620 of the roller driving unit 6C.

In the driving release mechanism according to another configuration example illustrated in FIG. 8, the meshing portion 630A of the idler gear 621A is configured by arranging at least two or more fitting pawls 631A projecting toward the meshing portion 640A of the facing drive release gear 622A in the circumferential direction of the drive shaft 627. By contrast, the meshing portion 640A of the drive release gear 622A is configured by arranging a plurality of fitting pawls 641A projecting toward the meshing portion 630A of the facing idler gear 621A and being meshed with the plurality of fitting pawls 631A in the circumferential direction of the drive shaft.

According to the configuration illustrated in FIG. 8, by allowing the drive release gear 622A to be operated on the drive shaft 627, for example, in the direction of arrow d1, the fitting pawls 641A that are the fitting members of the meshing portion 640A are meshed with the respective fitting pawls 631A that are the fitting members of the meshing portion 630A. In this state, the idler gear 621A and the drive release gear 622A are rotated together with the drive shaft 627.

In addition, in this configuration, by allowing the drive release gear 622A to be operated in the direction of arrow d2, the fitting pawls 641A of the meshing portion 640A and the fitting pawls 631A of the meshing portion 630A are in the state in which the fitting pawls 641A and the fitting pawls 631A are detached from each other, namely, in the state in which the fitting pawls 641A and the fitting pawls 631A are not meshed with each other. Therefore, the drive release gear 622A implements the driving release with respect to the driving force of the drive shaft 627.

Herein, a description of the driving force transmission device 620 of FIGS. 4 and 5 is given again.

The driving force transmission device 620 includes the slide body 623 that is mounted on the drive shaft 627, coaxially together with the idler gear 621 and the drive release gear 622.

The slide body 623 is configured with a cylindrical member having, for example, a slanted side portion 623*a*. The distal end portion of the projection piece 64*a* provided on the inner surface side thereof is in contact with the slanted side portion 623*a* when the document feeder cover 64 is closed. When the document feeder cover 64 is closed, the projection piece 64*a* gradually progresses downward (in the direction indicated by arrow d3) while the distal end of the projection piece 64*a* is in contact with the slanted side portion 623*a*. Along with this movement of the projection piece 64*a*, the slide body 623 slides in the shaft direction (in the direction indicated by arrow d1) of the drive shaft 627 from an initial position at which the slide body 623 is located before the distal end of the projection piece 64*a* comes in contact with the slanted side portion 623*a*. When the document feeder cover 64 is completely closed, the slide body 623 is in contact with a lateral side portion 64*c* of the projection piece 64*a* to be retained at a predetermined position (a slide position) on the drive shaft 627.

In addition, when the document feeder cover 64 is opened, the projection piece 64*a* is gradually retracted upward (direction of an arrow d4) while the distal end of the projection piece 64*a* is in contact with the slanted side portion 623*a*. Along with this movement of the projection piece 64*a*, the slide body 623 slides in the shaft direction of the drive shaft 627, namely, the direction of arrow d2 to return to the initial position from the predetermined slide position.

Further, the driving force transmission device 620 includes a first elastic member 625 and a second elastic member 626. The first elastic member 625 is inserted in the state in which the first elastic member 625 is wound around the drive shaft 627 and is inserted between the idler gear 621 and the drive release gear 622. The second elastic member 626 is similarly inserted in the state in which the second elastic member 626 is wound around the drive shaft 627 and is inserted between the drive release gear 622 and the slide body 623.

The first elastic member 625 disposed between the idler gear 621 and the drive release gear 622 exerts a biasing force on the two gears in such a direction that the meshing portions 630 and 640 are not engaged with each other (in the detaching direction). By contrast, the second elastic member 626 exerts a biasing force on the drive release gear 622 toward the idler gear 621 side in such a direction that the meshing portions 630 and 640 are engaged with each other (in the pressing direction) between the idler gear 621 and the drive release gear 622 in the other end side when the slide body 623 is set as one terminated end.

In this manner, the first elastic member 625 functions as a driving releasing compression spring between the idler gear 621 and the drive release gear 622, and the second elastic member 626 functions as a pressurizing compression spring between the idler gear 621 and the drive release gear 622. It is to be noted that the first elastic member 625 and the second elastic member 626 may be configured by using, for example, coil springs.

It is to be noted that, in the driving force transmission device 620, the configuration in which the second elastic member 626 is provided to pressurize between the idler gear 621 and the drive release gear 622 is employed for the following reason. Specifically, in some cases, in the driving force transmission device 620, if the slide body 623 directly pressurizes the drive release gear 622, the meshing portion 630 and the meshing portion 640 are not disengaged from each other and do not slide according to an angle of the gears. In this case, if the document feeder cover 64 is forcibly closed, the projection piece 64*a* of the document feeder cover 64 or the slide body 623 is likely to be destructed.

Herein, if a coil spring as the second elastic member 626 is provided between the idler gear 621 and the drive release gear 622, even in a case in which the meshing portion 630 and the meshing portion 640 are not coupled with each other well, the slide body 623 of the driving force transmission device 620 is moved by a distance corresponding to a stroke of the coil spring. Therefore, the slide body 623 slides up to a predetermined position, so that the projection piece 64*a* or the slide body 623 is prevented from being destructed. Thereafter, by rotating the sheet feeding motor 610, the idler gear 621 is rotated up to the position where the meshing portion 630 and the meshing portion 640 are engaged with each other, and the drive release gear 622 that is pressurized by the coil spring slides, so that smooth coupling is achieved.

In addition, in relation to the opening and closing function of the above-described document feeder cover 64, the ADF 6 includes a cover detection sensor 81 that detects opening and closing of the document feeder cover 64. In the present embodiment, for example, as illustrated in FIGS. 4 and 5, the cover detection sensor 81 is provided on the side surface of a shaft support member 80 that is in contact with one end side of the slide body 623 during the driving release between the idler gear 621 and the drive release gear 622 in the driving force transmission device 620.

The cover detection sensor 81 is configured with a photo-interrupter equipped with, for example, a light-emitting portion and a light-receiving portion facing each other and detects the opening and closing of the document feeder cover 64 by the light-receiving portion detecting whether or not light from the light-emitting portion is blocked by the projection piece 64*a*. Alternatively, the cover detection sensor 81 may be a sensor that mechanically detects whether or not the projection piece 64*a* is in contact with a sensing mechanism.

Next, a description is given of operations of the driving force transmission device 620, with reference to FIGS. 4 and 5.

When the document feeder cover 64 is opened, as illustrated in FIG. 5, in the ADF 6 according to the present embodiment, the projection piece 64*a* provided on the inner surface side of the document feeder cover 64 is not in contact with the slanted side portion 623*a* of the slide body 623.

At this time, the slide body 623 is biased in the left direction (a direction indicated by arrow d2) of the shaft direction of the drive shaft 627 in FIG. 5 due to the balance of the elastic force between first elastic member 625 and the second elastic member 626 to be balanced in the state that the slide body is in contact with the shaft support member 80 (in the state that the slide body is stopped at the initial position).

Namely, when the document feeder cover 64 is opened, the driving force transmission device 620 is set so that the biasing force of the first elastic member 625 and the biasing force of the second elastic member 626 are balanced in the state in which the meshing portion 630 and the meshing portion 640 are stopped at the positions where the two meshing portions are completely separated from each other.

Thereafter, when the document feeder cover 64 is closed, as illustrated in FIG. 4, the projection piece 64a of the document feeder cover 64 proceeds downward while being in contact with the slanted side portion 623a of the slide body 623. At this time, the slide body 623 of the driving force transmission device 620 is biased in the right direction (the direction indicated by arrow d1) of the shaft direction of the drive shaft 627 in FIG. 4 due to the balance between first elastic member 625 and the second elastic member 626. Then, when the document feeder cover 64 is completely closed, the elastic force between the first elastic member 625 and the second elastic member 626 is balanced in the state in which the slide body 623 is in contact with the lateral side portion 64c of the projection piece 64a (in the state that the slide body is stopped at a predetermined slide position).

Specifically, when the document feeder cover 64 is closed, the driving force transmission device 620 is set so that the biasing force of the first elastic member 625 and the biasing force of the second elastic member 626 are balanced in the state in which the meshing portion 630 and the meshing portion 640 are stopped at the positions where the two meshing portions are engaged with each other.

In the ADF 6 according to the present embodiment having the above-described configuration, as illustrated in FIG. 4, when the document feeder cover 64 is closed, the slide body 623 is pushed by the projection piece 64a of the document feeder cover 64 to be slid to the predetermined slide position and is stopped at the position. In this state, the external gear 641 of the meshing portion 640 of the drive release gear 622 is meshed with the internal gear 631 of the meshing portion 630 of the idler gear 621. Accordingly, the meshing portion 630 and the meshing portion 640 are brought into the state in which the meshing portions are rotated together with the drive shaft 627.

By contrast, as illustrated in FIG. 5, when the document feeder cover 64 is opened, in the ADF 6, the slide body 623 that is separated from the projection piece 64a of the document feeder cover 64 is returned to the initial position and is stopped at the position. In this state, the external gear 641 of the meshing portion 640 of the drive release gear 622 is disengaged from the internal gear 631 of the meshing portion 630 of the idler gear 621. Therefore, the drive release gear 622 is in the state in which the drive release gear can be rotated without interference of, for example, the self-lock function of the worm gear 610a that is a driving side gear on the drive shaft 627, namely, in the driving release state.

In the driving release state, the drive roller 72a is also in the state in which the drive roller 72a is not interfered by the self-lock function of the worm gear 610a through the rotation gear 722 meshed with the drive release gear 622. Therefore, in the driving release state, the user can rotate the drive roller 72a by using, for example, the operation dial 723.

Therefore, as a method of coping with the occurrence of the paper jam during the conveying of the original document in the ADF 6, the user opens the document feeder cover 64 first. Then, the user checks that the original document S causing the paper jam exists, for example, in the vicinity of the document conveying belt 72 and turns the operation dial 723 to rotate the rotary shaft 721 of the drive roller 72a. Specifically, the user appropriately rotates the document conveying belt 72 in the document conveying direction A or in the reverse direction.

In a comparative ADF having a configuration in which a meshing portion of a drive release gear and a meshing portion of an idler gear are engaged to each other and disengaged from each other, after driving a motor, conveying an original document, and stopping the motor, respective contact the surfaces of the meshing portions are closely contacted.

However, the configuration of the comparative ADF did not effectively provide a force releasing spring that applies a spring force to release the close contact state of the contact surfaces and overcome by superior force to a frictional force of the meshing force. Consequently, even if the document feeder cover is open, depending on the spring force of the force releasing spring, the comparative ADF could not release the close contact state of the meshing portions by overcoming the friction force of the meshing surface. Further, the comparative ADF includes a warm gear. Therefore, the reverse rotation of the idler gear was hindered by the self-lock function, and the close contact state of the meshing portions was not released.

Additionally, another comparative ADF including a plurality of involute spline joints did not include any mechanism to separate an involute spline joint of a drive side and an involute spline joint of a driven side from each other or any mechanism to the above-described separation in association with the opening operation of the document feeder cover.

Eventually, even when a paper jam occurred in the comparative ADF with an original document, the contact surfaces of the meshing portions are closely contact with each other. In this state, the driving force was not released reliably in association with opening of the document feeder cover, and therefore a sheet conveying roller remained locked. As a result, the jammed original document was not removed.

The rotation operation of the rotary shaft 721 of the drive roller 72a by using the operation dial 723 efficiently fulfills the function of releasing the contact state, for example, even in a case in which the contact surfaces of the internal gear 631 of the meshing portion 630 and the external gear 641 of the meshing portion 640 closely contact with each other. Therefore, the original document S causing the occurrence of the paper jam can be easily removed by turning the operation dial 723 without interference of the self-lock function of the worm gear 610a or the hypoid gear.

Next, a description is given of configurations and operations of a controller of the ADF 6.

Figure 10:
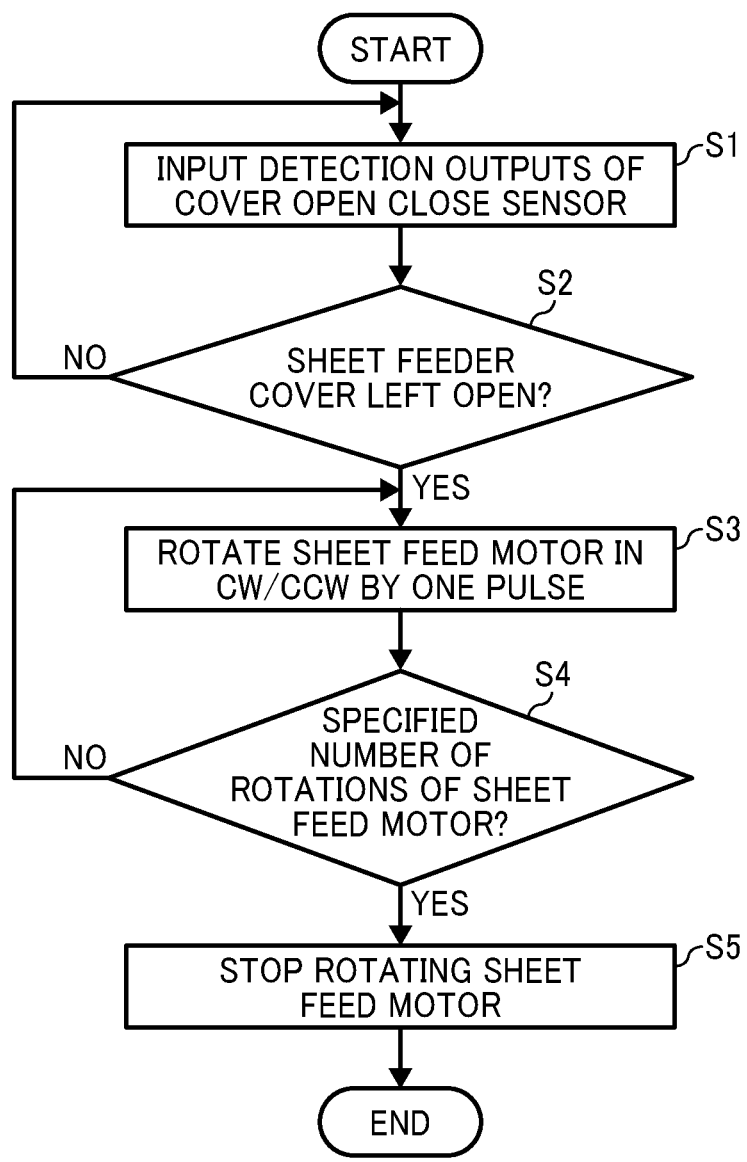
FIG. 10 is a flowchart illustrating repetitive driving control of a conveying motor at the time of driving release of the ADF controller.

FIG. 9 is a schematic functional block diagram of the overall image forming apparatus 1 including the ADF controller 67 that performs control of the overall ADF 6. FIG. 10 is a flowchart illustrating repetitive driving control of the conveying motor at the time of driving release of the driving release mechanism by the ADF controller 67.

As illustrated in FIG. 9, the ADF controller 67 of the ADF 6 is communicatably connected to the main body controller 25 of the main body 2 and the scanner controller 57 of the scanner 5 through an interface circuit 101 (hereinafter, referred to as an I/F 101). The ADF controller 67 includes a document conveying controller 671, a document reading controller 672, and a sheet feeding motor repetition driving controller 673.

In the ADF controller 67, the document conveying controller 671 causes the original documents S to be discharged one by one from a bundle of the original documents S placed on the document table 61 of the ADF 6. Then, the document conveying controller 671 also causes the original document S to be conveyed in the document conveying passage 6A until the original document S is ejected to the document ejection unit 65. In the control of the conveying, the document conveying controller 671 receives a copy start instruction transmitted from the main body controller 25 according to, for example, copy start operation of the user in the control unit 3.

Then, the document conveying controller 671 drives the sheet feeding motor 610 in response to the copy start instruction to rotate the pickup roller 71 and the drive roller 72a of the document conveying belt 72. By so doing, original documents S on a bundle of the original documents S placed on the document table 61 are conveyed toward the downstream side in the sheet feed direction one by one by the pickup roller 71 to be supplied (fed) toward the downstream side in the sheet feed direction by the document conveying belt 72 that is driven to be rotated by the drive roller 72a and the driven roller 72b.

Subsequently, the document conveying controller 671 sequentially drives the pull-out roller pair 74, the intermediate roller pair 75, the reading inlet roller pair 76, the reading outlet roller pair 77, the second reading outlet roller pair 78, and the sheet ejection roller pair 79 by respective driving motors. Therefore, the original document S fed out by the document conveying belt 72 is conveyed in the document conveying passage 6A sequentially toward the downstream side in the sheet feed direction and is ejected to the document ejection unit 65.

During the conveying of the original document S, the document reading controller 672 performs control of reading the image of the original document S by driving the fixed scanning portion 56 in accordance with a timing at which the original document S passes through the second contact glass 52 of the scanner 5. This control is performed in cooperation with the scanner controller 57 of the scanner 5.

The image data of the original document S read by the document reading controller 672 and the scanner controller 57 of the scanner 5 is transmitted through the IF 101 to the main body controller 25 of the main body 2. The main body controller 25 controls the image forming unit 23 to perform an electrophotographic process on the basis of the image data, to form the image corresponding to the image data on a sheet supplied from a document feed cassette 21, and to eject the sheet in the sheet ejection tray 22.

In a series of the above-described processes, the paper jam of the original document S may occur during the conveying of the original document S in the ADF 6, for example, in the vicinity of the document conveying belt 72. In this case, in order to check (inspect) the situation of occurrence of the paper jam, the user opens the document feeder cover 64 of the ADF 6, for example, up to the position indicated by a dotted line in FIG. 2. If the user opens the document feeder cover 64, the cover detection sensor 81 outputs a detection signal corresponding to the opened state of the document feeder cover 64.

By contrast, the sheet feeding motor repetition driving controller 673 in the ADF controller 67 of the ADF 6 monitors the detection signal of the cover detection sensor 81. The sheet feeding motor repetition driving controller 673 acquires the detection signal of the cover detection sensor 81 and performs control of repetitive driving of the sheet feeding motor 610 illustrated in FIG. 10.

In FIG. 10, the sheet feeding motor repetition driving controller 673 acquires a detection signal of the cover detection sensor 81 (in step S1) and determines whether the document feeder cover 64 is in an opened state or in a closed state according to whether or not the detection signal is a detection signal corresponding to the opened state of the document feeder cover 64 (in step S2).

Here, when it is determined that the document feeder cover 64 is not in the opened state, that is, the document feeder cover is in the closed state (No in step S2), the sheet feeding motor repetition driving controller 673 repetitively performs the process after step S1.

By contrast, when it is determined that the document feeder cover 64 is in the opened state (Yes in step S2), the sheet feeding motor repetition driving controller 673 starts control of repetitive rotation driving of the sheet feeding motor 610 in the forward rotation direction, for example, the clockwise (CW) direction and in the reverse rotation direction thereof, that is, the counterclockwise (CCW) direction. In this control, the sheet feeding motor repetition driving controller 673 sends, for example, a pulse for driving in the CW direction and a pulse for driving in the CCW direction to the sheet feeding motor 610 in a unit of one pulse (in step S3).

Subsequently, the sheet feeding motor repetition driving controller 673 determines whether or not the number of times of sending of one pulse for rotation driving in the CW direction and the CCW direction is a predetermined number of times that is defined in advance (in step S4). In addition, it is preferable that a configuration in which the rotation driving in the CW direction and the CCW direction are repeated at least one time.

Here, in a case in which it is determined that the number of times of sending of the pulse is not the predetermined number of times (No in step S4), the sheet feeding motor repetition driving controller 673 repetitively performs the processes of step S3 and the following steps.

On the contrary, in a case in which it is determined that the number of times of sending of the pulse is the predetermined number of times (Yes in step S4), the sheet feeding motor repetition driving controller 673 stops rotation driving of the sheet feeding motor 610 in the CW/CCW direction (in step S5), and a series of the above-described processes are finished.

The control of repetitive driving of the sheet feeding motor 610 illustrated in FIG. 10 is performed, for example, each time the paper jam of the original document S occurs in the document conveying passage 6A, and thus, the user opens the document feeder cover 64. On the other hand, the slide body 623 of the driving force transmission device 620 of the ADF 6 is operated in the direction in which the engagement of meshing portion 640 of the drive release gear 622 with the meshing portion 630 of the idler gear 621 is to be released, while following the retraction of the projection piece 64a at the time when the document feeder cover 64 is opened (see FIG. 5).

At this time, in a case in which, for example, the internal gear 631 of the meshing portion 630 of the idler gear 621 and the external gear 641 of the meshing portion 640 of the drive release gear 622 are meshed with each other in an incomplete state, complete release may not be achieved by the elastic force of the first elastic member 625.

As illustrated in FIG. 10, in the ADF 6 according to the embodiment, control of a predetermined number of times of the rotation driving of the sheet feeding motor 610 in the forward rotation direction and the reverse rotation direction is performed at the timing at which the document feeder cover 64 is opened. Due to this control, even when the internal gear 631 of the meshing portion 630 and the external gear 641 of the meshing portion 640 are incompletely meshed with each other in the ADF 6, the two gears are assisted so as to be completely disengaged from each other, for example, as illustrated in FIG. 5. Therefore, the ADF 6 causes the driving force transmission device 620 to securely proceed to the driving release state.

As described above, the ADF 6 according to the present embodiment of this disclosure includes the drive roller 72a that conveys the original document S along the document conveying passage 6A, the document feeder cover 64 that is openable between the state in which the document feeder cover is closed relative to the document conveying passage 6A. By so doing, the document feeder 60 of the original document S is formed and the state in which the document feeder cover is opened so that the document feeder 60 of the original document S can be inspected, the projection piece 64a which is provided on the inner surface of the document feeder cover 64 corresponding to the document conveying passage 6A, the sheet feeding motor 610 which drives the drive roller 72a, the worm gear 610a or the hypoid gear as a driving side gear which is attached to the output shaft of the sheet feeding motor 610, and the driving force transmission device 620 where the idler gear 621 having the meshing portion 630 and being meshed with the driving side gear, the drive release gear 622 having the meshing portion 640 which is to be engaged with the meshing portion 630, the slide body 623 being pushed to slide by the projection piece 64a which is in contact when the document feeder cover 64 is closed, the first elastic member 625 being inserted between the idler gear 621 and the drive release gear 622 to bias the idler gear 621 and the drive release gear 622 in the direction where the idler gear and the drive release gear are to be separated from each other, and the second elastic member 626 being inserted between the drive release gear 622 and the slide body 623 to bias the drive release gear 622 and the slide body 623 in the direction where the drive release gear and the slide body are to be separated from each other are attached to the same drive shaft 627 along the shaft direction, in which, at the slide position of the slide body 623 when the document feeder cover 64 is closed, the drive release gear 622 is pushed on the idler gear 621 by a biasing force of the second elastic member 626, so that the meshing portion 630 and the meshing portion 640 are engaged with each other, and in which, at the slide position of the slide body 623 when the document feeder cover 64 is opened, the drive release gear 622 is separated from the idler gear 621 by a biasing force of the first elastic member 625, so that the engagement between the meshing portion 630 and the meshing portion 640 is released.

For this reason, in the ADF 6 according to the embodiment, due to the driving release, the connection to the driving side gear, for example, the worm gear 610a is cut off, so that the self-lock of the worm gear 610a can be released, and thus, the gear can be rotated from the sheet conveying roller, for example, the drive roller 72a side. Therefore, even in a case in which the worm gear 610a is used, it is possible to prevent the lock of the sheet extraction during the treatment of the paper jam. Namely, in the embodiment, it is possible to provide the ADF 6 capable of securely performing the driving release of the driving release mechanism in cooperation with the opening operation of the document feeder cover 64 and capable of smoothly performing the treatment of the paper jam by preventing the lock of the driving release mechanism.

In addition, the ADF 6 according to the embodiment further include the cover detection sensor 81 which detects whether the document feeder cover 64 is closed or opened and the sheet feeding motor repetition driving controller 673 which drives the sheet feeding motor 610 to be rotated in the forward rotation direction and the reverse rotation direction repetitively at least one time of the predetermined number of times when it is detected that the document feeder cover 64 is opened.

In this manner, in the ADF 6 according to the embodiment, when the document feeder cover 64 is opened, the sheet feeding motor 610 is rotated the number of times corresponding to several pulses. Therefore, the meshing portion 640 of the drive release gear 622 which cannot be slid due to friction caused by the close contact with the meshing portion 630 or the self-lock of the worm gear 610a is disengaged, so that the driving release can be securely performed.

In addition, the ADF 6 according to the embodiment has the configuration that, when the document feeder cover 64 is closed, in the state that the meshing portion 630 and the meshing portion 640 are stopped at the positions where the meshing portions are engaged with each other, the biasing force of the first elastic member 625 and the biasing force of the second elastic member 626 are balanced.

For this reason, in the ADF 6 according to the embodiment, when the document feeder cover 64 is closed, the meshing portion 630 and the meshing portion 640 are allowed to be securely and reliably engaged with each other, so that the driving force can be securely transmitted, and thus, it is possible to reduce the risk of destruction of the projection piece 64a of the document feeder cover 64, the slide body 623, and the like.

In addition, the ADF 6 according to the embodiment has the configuration that, when document feeder cover 64 is opened, in the state that the meshing portion 630 and the meshing portion 640 are stopped at the positions where the meshing portions are separated from each other, the biasing force of the first elastic member 625 and the biasing force of the second elastic member 626 are balanced.

For this reason, in the ADF 6 according to the embodiment, even in a case in which the paper jam of the original document S occurs, so that the meshing portion 630 and the meshing portion 640 are in the closely contacted state, when the document feeder cover 64 is opened, the two meshing portions are securely detached from each other by a force exceeding the frictional force, so that the treatment of removing the paper jam can be performed.

In addition, in the ADF 6 according to the embodiment, the meshing portion 630 is configured with a plurality of fitting pawls 631A provided in the circumferential direction of the drive shaft 627, and the meshing portion 640 is configured with a plurality of fitting pawls 641A which is provided in the circumferential direction of the drive shaft 627 and is meshed with the plurality of fitting pawls 631A.

For this reason, in the ADF 6 according to the embodiment, the driving release mechanism can be implemented by the configuration of engaging and disengaging a plurality of fitting pawls 631A of the meshing portion 630 and a plurality of fitting pawls 641A of the meshing portion 640.

In addition, in the ADF 6 according to the embodiment, the meshing portion 630 is configured with an involute-spline-shaped internal gear 631, and the meshing portion 640 is configured with an involute-spline-shaped external gear 641.

For this reason, in the ADF 6 according to the embodiment, the driving release mechanism can be implemented by the meshing portion 630 and the meshing portion 640 using the involute spline joint.

In addition, the image reading device according to the embodiment includes the above-described ADF 6. In addition, the image forming apparatus 1 according to the embodiment includes the image reading device having the above-described ADF 6.

For this reason, in the image reading device and the image forming apparatus 1 according to the embodiment, in a case in which the paper jam of the original document occurs in the ADF 6, by opening the document feeder cover 64 to cut off the connection to the driving side gear, for example, the worm gear 610$a$, so that it is possible to prevent the lock of the sheet extraction during the treatment of the paper jam. Therefore, according to the embodiment, it is possible to provide the image reading device and the image forming apparatus 1 capable of securely performing the driving release of the driving release mechanism in cooperation with the opening operation of the document feeder cover 64 of the ADF 6 and capable of smoothly performing the treatment of the paper jam by preventing the lock of the driving release mechanism.

Other Embodiments

This disclosure is not limited the above-described embodiment, but it includes various forms which design is changed without departing from the spirit of this disclosure within the technical scope of this disclosure disclosed in the claims.

For example, in the above-described embodiment, exemplified is the case where the drive release gear 622 in the driving force transmission device 620 of the roller driving unit 6C is connected to the drive roller 72$a$, and in the driving release, the document conveying belt 72 is rotated through the drive roller 72$a$. This disclosure is not limited thereto, but a configuration where the drive release gear 622 is connected to other rollers capable of conveying the original document S and being associated with the removal of the paper jam of the original document S, for example, the driving-side roller such as the pull-out roller pair 74 or the intermediate roller pair 75 may be employed.

In addition, in the above-described embodiment, exemplified is the case specialized in the conveying of the original document S. However, this disclosure is not limited to the original document S, but it may also be applied to a sheet conveying device which conveys a sheet-shaped medium such as recording sheets.

As described heretofore, the automatic document feeder according to this disclosure has the effects of being capable of securely performing the driving release of the driving release mechanism in cooperation with the opening operation of the document feeder cover 64 and being capable of preventing the lock of the driving release mechanism, and thus, the automatic document feeder according to this disclosure can be applied to all automatic document feeders employing a driving release mechanism using a worm gear or a hypoid gear as a driving side gear.

The above-described embodiments are illustrative and do not limit this disclosure. Thus, numerous additional modifications and variations are possible in light of the above teachings. For example, elements at least one of features of different illustrative and exemplary embodiments herein may be combined with each other at least one of substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of this disclosure may be practiced otherwise than as specifically described herein.

What is claimed is:

1. An automatic document feeder comprising:
   a sheet conveying roller configured to convey an original document along a document conveying passage;
   a document feeder cover openable between a closed state relative to the document conveying passage in which a document feeder of the original document is defined and an open state in which the document feeder is checked;
   a projection piece mounted on an inner face side of the document feeder cover corresponding to the document conveying passage;
   a motor having an output shaft and configured to drive the sheet conveying roller;
   a driving side gear mounted on the output shaft of the motor; and
   a driving force transmission device, comprising:
      an idler gear having a driving side meshing portion and configured to be meshed with the driving side gear;
      a driving force release gear having a driven side meshing portion configured to be meshed with the driving side meshing portion;
      a slide body configured to be pressed by the projection piece and slide when the document feeder cover is closed and brought into contact with the projection piece;
      a first elastic body being inserted between the idler gear and the driving force release gear and configured to bias the idler gear and the driving force release gear in a direction to separate the idler gear and the driving force release gear from each other;
      a second elastic body being inserted between the driving force release gear and the slide body and configured to bias the driving force release gear and the slide body in a direction to separate the driving force release gear and the slide body from each other; and
      a drive shaft on which the idler gear, the driving force release gear, the slide body, the first elastic body, and the second elastic body are mounted coaxially,
   the driving force transmission device configured to mesh the driving side meshing portion and the driven side meshing portion together by pressing the driving force release gear against the idler gear with a biasing force applied by the second elastic body at a first sliding position of the slide body when the document feeder cover is closed, and
   the driving force transmission device configured to release engagement of the driving side meshing portion and the driven side meshing portion by separating the driving force release gear from the idler gear with a biasing force applied by the first elastic body at a second sliding position of the slide body when the document feeder cover is opened.

2. The automatic document feeder according to claim 1, wherein the driving side gear mounted on the output shaft of the motor is a worm gear.

3. The automatic document feeder according to claim 1, wherein the driving side gear mounted on the output shaft of the motor is a hypoid gear.

4. The automatic document feeder according to claim 1, further comprising:
   a cover detector to detect whether the document feeder cover is closed or opened; and
   a motor repetition driving controller to drive the motor to be rotated in a forward rotation direction and a reverse rotation direction repetitively at least one time of a predetermined number of times when the cover detector detects that the document feeder cover is opened.

5. The automatic document feeder according to claim 1, wherein, when the document feeder cover is closed, in the state that the driving side meshing portion and the driven side meshing portion are stopped at positions where the meshing portions are engaged with each other, the biasing force of the first elastic member and the biasing force of the second elastic member are balanced.

6. The automatic document feeder according to claim 1, wherein, when the document feeder cover is opened, in the state that the driving side meshing portion and the driven side meshing portion are stopped at positions where the meshing portions are separated from each other, the biasing force of the first elastic member and the biasing force of the second elastic member are balanced.

7. The automatic document feeder according to claim 1, wherein the driving side meshing portion is configured with multiple driving side fitting pawls provided in a circumferential direction of the drive shaft, and the driven side meshing portion is configured with multiple driven side fitting pawls that are provided along the circumferential direction of the drive shaft and are meshed with the driving side fitting pawls.

8. The automatic document feeder according to claim 1, wherein the driving side meshing portion is configured with an involute-spline-shaped internal gear, and the driven side meshing portion is configured with an involute-spline-shaped external gear.

9. An image reading device comprising the automatic document feeder according to claim 1.

10. An image forming apparatus comprising the image reading device according to claim 9.

* * * * *